United States Patent
Baldwin

(10) Patent No.: US 10,284,524 B2
(45) Date of Patent: May 7, 2019

(54) SECURE AUTO-PROVISIONING DEVICE NETWORK

(71) Applicant: James Armand Baldwin, Palo Alto, CA (US)

(72) Inventor: James Armand Baldwin, Palo Alto, CA (US)

(*) Notice: Subject to any disclaimer, the term of this patent is extended or adjusted under 35 U.S.C. 154(b) by 0 days.

(21) Appl. No.: 14/610,223

(22) Filed: Jan. 30, 2015

(65) Prior Publication Data
US 2016/0344699 A1    Nov. 24, 2016

Related U.S. Application Data

(60) Provisional application No. 62/040,240, filed on Aug. 21, 2014.

(51) Int. Cl.
| | |
|---|---|
| H04L 29/06 | (2006.01) |
| H04L 12/66 | (2006.01) |
| H04W 76/18 | (2018.01) |
| H04L 29/08 | (2006.01) |

(52) U.S. Cl.
CPC .......... *H04L 63/0272* (2013.01); *H04L 12/66* (2013.01); *H04L 63/0281* (2013.01); *H04L 63/0823* (2013.01); *H04W 76/18* (2018.02); *H04L 67/02* (2013.01)

(58) Field of Classification Search
CPC . H04L 63/0272; H04L 12/66; H04L 63/0281; H04L 63/0823; H04L 67/02; H04L 29/06; H04W 76/027; H04W 76/18
USPC .......................................................... 726/10
See application file for complete search history.

(56) References Cited

U.S. PATENT DOCUMENTS

| | | | | |
|---|---|---|---|---|
| 5,745,701 | A * | 4/1998 | Nguyen-Thai | H04Q 3/62 709/249 |
| 8,607,306 | B1 * | 12/2013 | Bridge | H04L 63/068 726/1 |
| 8,780,890 | B2 * | 7/2014 | Huang | H04L 12/6418 370/352 |
| 8,875,223 | B1 * | 10/2014 | Chen | H04L 63/0272 726/1 |
| 9,391,921 | B1 * | 7/2016 | Riddle | H04L 47/78 |
| 2004/0054792 | A1 * | 3/2004 | Pitsos | H04L 63/02 709/229 |
| 2006/0092971 | A1 * | 5/2006 | Okita | H04L 12/2854 370/468 |
| 2007/0248232 | A1 * | 10/2007 | Driscoll | H04L 9/0822 380/280 |
| 2008/0120656 | A1 * | 5/2008 | Jupin | G06Q 30/02 725/70 |
| 2008/0292105 | A1 * | 11/2008 | Wan | H04L 9/0825 380/282 |
| 2009/0113537 | A1 * | 4/2009 | Woo | H04L 63/0823 726/12 |
| 2012/0026865 | A1 * | 2/2012 | Fan | H04W 24/00 370/225 |

(Continued)

*Primary Examiner* — Farid Homayounmehr
*Assistant Examiner* — Sanchit K Sarker
(74) *Attorney, Agent, or Firm* — Larisa Migachyov

(57) ABSTRACT

A system comprising a gateway capable of connecting to an Internet router, and at least one Internet-connected device, said Internet-connected device comprising a digital certificate limiting its Internet access to a particular server or servers, said gateway capable of verifying the certificate and connecting the Internet-connected device to its server or servers.

21 Claims, 4 Drawing Sheets

(56) References Cited

U.S. PATENT DOCUMENTS

| | | | |
|---|---|---|---|
| 2012/0303952 A1* | 11/2012 | Smith | G06F 21/44 713/158 |
| 2013/0051331 A1* | 2/2013 | Bao | H04W 28/24 370/329 |
| 2013/0055336 A1* | 2/2013 | Li | G06F 21/33 726/1 |
| 2013/0290722 A1* | 10/2013 | Kall | H04L 12/4633 713/171 |
| 2015/0052351 A1* | 2/2015 | Nodehi Fard Haghighi | H04L 63/0823 713/156 |
| 2015/0312041 A1* | 10/2015 | Choi | H04L 9/3231 713/175 |
| 2015/0350167 A1* | 12/2015 | Djakovic | H04L 63/0428 713/163 |
| 2016/0013948 A1* | 1/2016 | Moses | H04L 63/0823 713/156 |
| 2016/0219017 A1* | 7/2016 | Kolhi | H04L 61/1511 |
| 2016/0278006 A1* | 9/2016 | Lee | H04W 76/10 |
| 2016/0337127 A1* | 11/2016 | Schultz | H04W 4/70 |
| 2016/0344699 A1* | 11/2016 | Baldwin | H04W 76/18 |
| 2017/0149751 A1* | 5/2017 | Kall | H04L 12/4633 |
| 2017/0272316 A1* | 9/2017 | Johnson | H04L 61/301 |
| 2017/0310485 A1* | 10/2017 | Robbins | H04L 9/16 |

\* cited by examiner

SECURE AUTO-PROVISIONING DEVICE NETWORK

CROSS-REFERENCE TO RELATED APPLICATIONS

The present application takes priority from Provisional App. No. 62/040,240, filed Aug. 21, 2014, which is herein incorporated by reference.

BACKGROUND

The "Internet of Things" has made it possible for almost any device in the home or office to connect to the Internet. Internet connectivity may be used to allow a user to remotely control the operation of many devices, or to receive data from any remote device. Such devices typically connect to the Internet by using wi-fi and connecting to the user's wireless router.

Typically, a device such as a light fixture, a fish tank, a refrigerator, or a similar device, only needs to connect to a particular server in order to perform the function it needs to perform. For example, a refrigerator may only need to connect to the website of a grocery store to allow it to communicate that certain food items need reordering, but may not necessarily need to connect to any other server. However, a wi-fi connection would give the refrigerator full access to the Internet, and a sufficiently determined hacker could gain access to any other device in the wi-fi network by breaching security at the level of the refrigerator, the light switch, or any other device in the Internet of Things. Since more and more devices are now acquiring Internet connectivity, this would mean an extremely costly security effort to protect every single Internet-connected appliance in the home.

Another problem with the current state of the art in Internet-connected devices is that they typically require an initial setup step to be "paired" to an Internet router. While this improves security, since something like a flowerpot or a refrigerator does not usually have a display or a user interface, the setup step is likely to be rather laborious. Also, if an Internet-connected device is paired to a particular Internet router, taking it to a different location requires that the setup step be performed all over again.

A need therefore exists for a more secure alternative protocol that does not require a setup step at each location of use.

SUMMARY OF THE INVENTION

An object of the present invention is to provide an alternate wireless network for use with Internet-connected devices that does not allow a hacker to use these devices to breach security and compromise the rest of the network.

Another object of the present invention is to provide a low power wireless network for use with Internet-connected devices that does not drain the device's battery as much as wi-fi does.

Another object of the present invention is to provide an alternate wireless protocol for Internet-connected devices that does not require a password or a setup step.

For purposes of the present disclosure, an "Internet-connected device" or "device" is any device that needs a limited Internet connection to function, but does not need unlimited access to the Internet.

The method of the present invention comprises creating a digital certificate to be stored on the Internet-connected device, with said digital certificate comprising at least one web address. The web address is preferably the address of a server that the Internet-connected device needs to connect to. The method of the present invention then comprises requesting the device to provide the digital certificate, validating the digital certificate, reading the digital certificate to determine the web address that the Internet-connected device is allowed to connect to, and setting up a secure channel between the Internet-connected device and the web address such that the Internet-connected device can only connect to that particular web address and no other addresses.

The secure channel may be secured by any commonly-used technologies, such as SSL, VPN, and so on. Traffic on the secure channel may also be encrypted for greater security.

In the preferred embodiment, if the digital certificate cannot be validated, the device is disconnected. Similarly, if the digital certificate has been revoked, the device is disconnected.

In the preferred embodiment, the requesting, validating, reading, and setting up a secure channel steps are performed by a gateway that is connected to the Internet-connected device and to the Internet. The gateway may connect to the Internet-connected device wirelessly, by wi-fi, Bluetooth, or any other wireless connection. The gateway may connect to an Internet router wirelessly or by a wired connection such as an Ethernet cable.

In an embodiment, the gateway is connected to the Internet directly and comprises an Internet router.

The system of the present invention comprises a system for securely connecting an Internet-connected device to a particular server or servers, comprising an Internet router, a gateway connected to the router, and at least one Internet-connected device connected to the gateway. Each Internet-connected device comprises a digital certificate, said digital certificate comprising at least one web address of a server. The gateway is configured to connect to the device, receive the digital certificate from the device, validate the digital certificate (and in an embodiment, determine whether or not the certificate has been revoked), and if the digital certificate is valid, read it to determine the web address of the server, and set up a secure channel for the device to connect to that server via the router. The gateway may connect to the router by any commonly known methods, including wi-fi, Ethernet, Bluetooth, or any other connection protocol known in the art. Similarly, the gateway may connect to the Internet-connected device by any commonly known wireless methods, including wi-fi, Bluetooth, and any other connection protocol known in the art.

The gateway of the present invention preferably comprises a processor, a memory, a connection to at least one device, and a connection to the Internet, where the processor is configured to initiate a connection with the at least one device, request the device's digital certificate, validate the digital certificate (and, in an embodiment, check if the digital certificate has been revoked), read the digital certificate to determine the address or addresses of at least one web server, and set up a secure channel for the device to connect to the at least one web server and to no other web servers. The gateway's connection to the Internet is preferably a wireless or wired connection to a router; the wireless connection can be wi-fi, Bluetooth, or any other connection protocol sufficient for connecting to the Internet. In an embodiment, the gateway may comprise an Internet router module which is capable of connecting to the Internet by wi-fi, Bluetooth, a cable, or any other connection protocol sufficient for connecting to the Internet. The connection to the at least one device is preferably wireless, and may be wi-fi, Bluetooth, or any other wireless connection protocol sufficient for that purpose.

In an embodiment, the gateway may also be configured to exclude certain types of devices, or certain individual devices, from connecting to the gateway. In that embodiment, the gateway checks the type of the device or the device ID, determines whether or not the type of device or individual device ID is on the list of excluded devices, and disconnecting the device if it is on that list.

In an embodiment, the gateway may be configured to limit the amount of bandwidth available to a particular device or type of device. In that embodiment, the gateway checks the type of device or the device ID, determines whether or not the type of device or individual device ID is on the list of bandwidth-limited devices and what the bandwidth limit is for the device, and limiting the amount of bandwidth available to that device to the given limit.

In an embodiment, gateways may connect to each other in a mesh network configuration, or in any other network configuration. A gateway may therefore be able to set up a secure channel of communication with another gateway.

LIST OF FIGURES

DETAILED DESCRIPTION OF THE PREFERRED EMBODIMENT

For purposes of the present disclosure, a "device" or "Internet-connected device" is an Internet-connected object that does not need full access to the Internet, but rather, only requires access to a particular server or servers. Such devices may be any Internet-connected objects commonly used in the "Internet of Things", such as thermostats, burglar alarms, refrigerators, pet collars, and any other devices that require a limited Internet connectivity.

Figure 1:
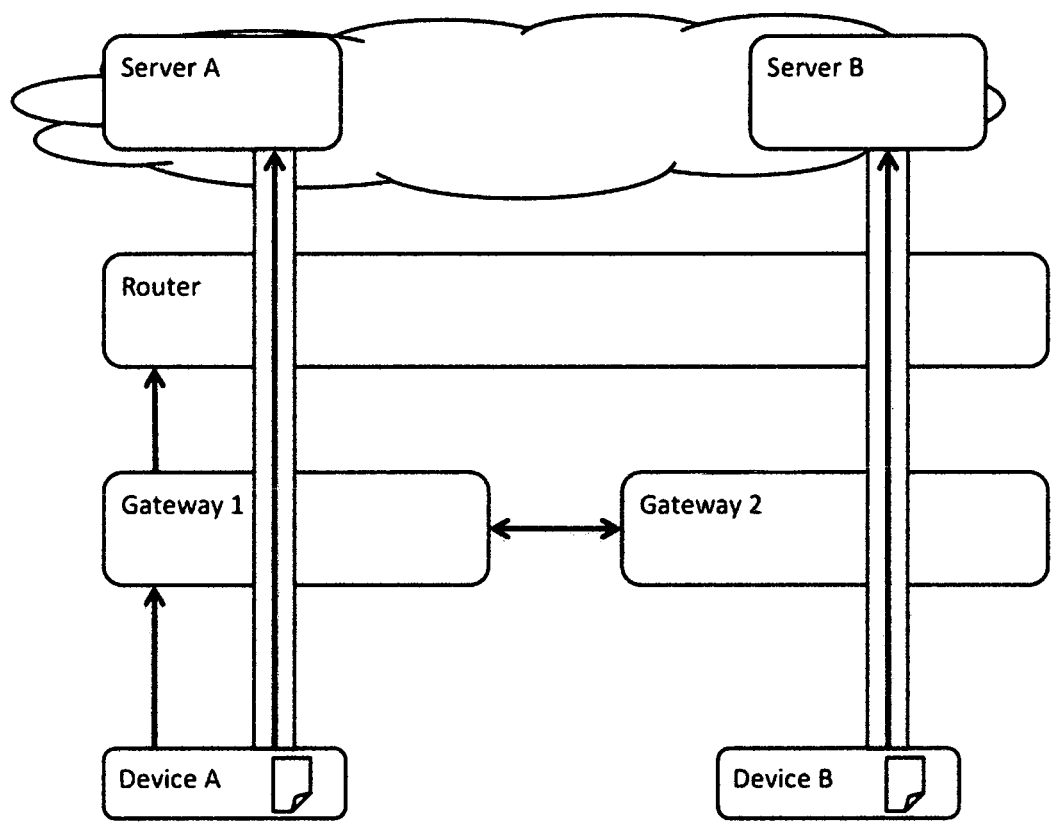
FIG. 1 shows a diagram of the preferred embodiment of the present invention.

FIG. 1 shows a sample embodiment of the present invention. Device A and Device B are Internet-connected devices that only require a connection to Server A and Server B respectively. In order to connect to its respective server, Device A connects to a gateway (Gateway 1) and presents a digital certificate. The digital certificate specifies the server or servers to which Device A is allowed to connect. After Gateway 1 verifies the certificate, it connects to the server specified in the certificate, and creates a secure channel between Device A and Server A through an Internet router as shown. Then, all of Device A traffic is routed through that channel. Device A is not allowed to connect to any other server other than Server A. Similarly, Device B connects to Gateway 2 and presents its digital certificate, which specifies the server or servers to which Device B is allowed to connect. Gateway 2 verifies the certificate and connects to the server specified in the certificate (in this case, Server B) and creates a secure channel between Device B and Server B. In this embodiment of the invention, Gateway 2 does not connect to the Internet router directly, but rather through Gateway 1. In the preferred embodiment, multiple gateways may be able to connect to each other as a mesh network. However, this is not required to practice the present invention.

Since the only part of the network to which Device A (or Device B) connects is the gateway, it does not require a password—the gateway is sufficient to authenticate the device. Since the digital certificate is preferably set by the manufacturer when the device is manufactured, it will be difficult to alter and thus difficult to use the device to hack into the network. If a hacker gets access to the device, all that they would be able to access would be the device's designated server, which is not any different from connecting to that designated server directly; thus, the hacker gains no advantage.

The other advantage of the present invention is that no setup steps are required to "pair" a device with an Internet connection. The gateway automatically connects to the device and automatically reads and validates its certificate. This means that the owner of a device can take it to any location—home, work, a café, a friend's house—and as long as the location has a gateway, it can automatically connect to the device and allow it to connect to its designated server without any setup required. Since the device's certificate is preferably set at manufacturing time, and the server to which it is allowed to connect is set in the certificate, there's no password required—the only server to which the device is allowed to connect is the server for which it is authenticated.

The gateway is preferably connected to the router via Ethernet. This means that the connection between the gateway and the Internet is also difficult for a hacker to alter. However, any other connection method can be used as well as long as it enables a sufficiently secure connection between the gateway and the router.

Two or more gateways may be connected to each other as a mesh network, as shown in FIG. 1 (i.e. Gateway A and Gateway B). As long as one gateway is connected to the router, any number of other gateways can connect to it and thus connect to the router through it.

Figure 2:
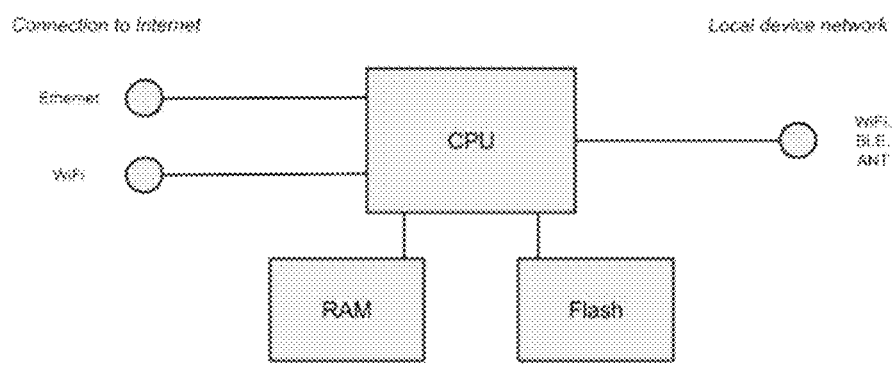
FIG. 2 shows a block diagram of a gateway of the preferred embodiment of the present invention.

FIG. 2 shows a diagram of a gateway. It preferably comprises a processor and memory, and a connection to the Internet (i.e. to an Internet router) and a wireless connection that can be used to connect to a device or to multiple devices. The processor is configured to respond to any queries by a device, to request and receive a device's digital certificate, to verify that the certificate is valid and not revoked, and to read the certificate to determine what server the device needs to connect to. After reading the certificate, the processor then can set up a secure channel for the device to communicate with that server.

Figure 3:
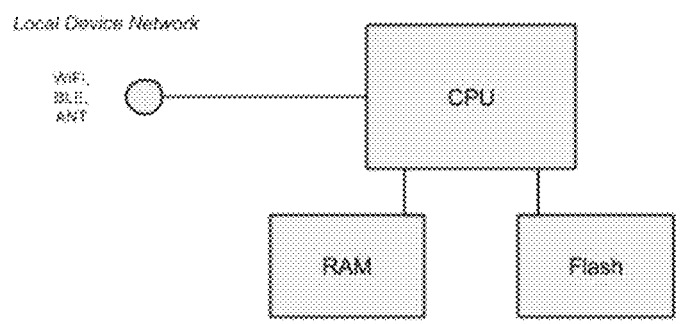
FIG. 3 shows a block diagram of an Internet-connected device of the preferred embodiment of the present invention.

FIG. 3 shows a diagram of a typical device. Such a device can be any object that requires an Internet connection to function. It preferably comprises a processor, a memory, and a communications module, as well as any other modules it needs to function. The processor is preferably configured to automatically initiate connection with any gateway within range, to send a digital certificate when requested by the gateway, and to remain connected to the gateway until the connection is terminated. The memory is preferably sufficient to store a digital certificate and any programming or data required for the device to function.

Figure 4:
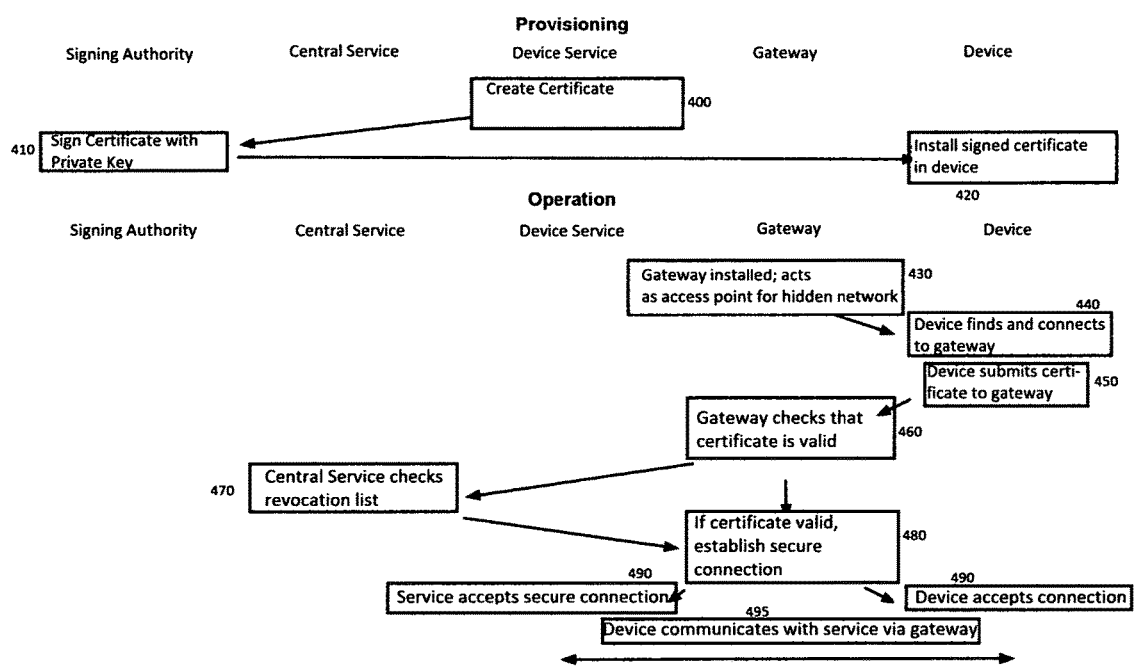
FIG. 4 shows a flow diagram of the operation of the preferred embodiment of the method of the present invention.

FIG. 4 shows a flow diagram of the process of connecting a device to a gateway. First, a certificate is created on the device 400 that describes the services a device will be allowed to access. The certificate is signed with a private key 410 and installed in the device 420. These steps are performed during the manufacture and provisioning of the device.

During operation, a gateway is installed and connected to the Internet 430. The gateway acts an access point for a network, which is preferably a hidden network. The device finds the gateway 440 and connects to it; it then submits its certificate to the gateway 450. The connection may be initiated automatically (i.e. the device sends out queries at regular intervals looking for a gateway) or manually (a user can trigger a connection to a gateway by pressing a button, for example).

Once the gateway receives the certificate, it checks it for validity 460. In an embodiment, the gateway may also check the central service for whether or not the certificate has been revoked 470. If the certificate is invalid or revoked, the gateway terminates the connection with the device; if it is valid, the gateway establishes a secure connection to the Internet service identified in the certificate and to the device 480. After the service and the device accept the connection 490, the device communicates with the service via the gateway 495.

In an embodiment (not shown), the gateway also verifies whether or not the device is banned from connecting to the network or whether or not this The communication protocol between the Internet-connected devices and the gateway can be any protocol in common use. However, it is preferably a low-power protocol that would allow lower-power communication such as Bluetooth. This would conserve battery life in Internet-connected devices.

The traffic between the Internet-connected device and the server can be encrypted in any way commonly known in the art in order to improve security.

Since the communication protocol between the Internet-connected device and the gateway is standard, any gateway connected to a network can be used. For example, a user could take their Internet-connected device to a café and use it to connect to its preferred server via the gateway installed in the café's network, and then take it home and use it to connect to its preferred server via the gateway installed at home. This is an improvement over the prior art systems that would require complex setup steps for an Internet-connected device to get online. No matter where the Internet-connected device is located, the gateway will only let it connect to the server specified in its certificate. As the Internet of Things becomes more widespread, more and more home and office networks will have similar gateways installed, thus enabling Internet-connected devices to be used anywhere.

As has been mentioned previously herein, many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. A method of connecting a device to a web service via a Wi-Fi network, comprising:
   creating a digital certificate to be stored on the device, said digital certificate comprising one and only one web service address;
   storing the digital certificate on the device;
   configuring a gateway, wherein the gateway comprises:
   a connection to an Internet router;
   a processor and a memory, wherein the processor is configured to store at least one digital certificate of the device in memory;
   a connection to the device;
   using the gateway to request the device to provide the digital certificate, and using the gateway to keep the device disconnected from the Internet router and the Wi-Fi network;
   using the gateway to validate the digital certificate while the device is still disconnected from the Internet router and the Wi-Fi network;
   using the gateway to read the digital certificate to determine the web service address while the device is still disconnected from the Internet router and the Wi-Fi network;
   connecting the device only to the web service address listed in a digital certificate on the device via the Wi-Fi network by setting up a secure channel between the device and the web service through the gateway wherein the device cannot connect to any other web service and any other local network resource.

2. The method of claim 1, where the secure channel is secured by one of the following group: Secure Shell, Secure Sockets Layer, Transport Layer Security, Virtual Private Network.

3. The method of claim 1, further comprising: after the validating step, if the digital certificate cannot be validated, disconnecting the device; else, keeping the device connected.

4. The method of claim 1, further comprising: after the validating step, checking for revocations of the digital certificate;
   if the digital certificate has been revoked, disconnecting the device; else, keeping the device connected.

5. The method of claim 1, further comprising:
   after the validating step, checking whether the device is on a list of devices that are banned from connecting;
   disconnecting the device if it is on the list of devices that are banned from connecting; else, keeping the device connected.

6. The method of claim 1, further comprising:
   after the validating step, checking whether the device is on a list of devices whose bandwidth is limited;
   if the device is on the list, determining the maximum allowable bandwidth for the device;
   limiting the device's bandwidth to the maximum allowable bandwidth.

7. The method of claim 1, where the requesting, validating, reading, and setting up steps are performed by a gateway device, said gateway device comprising a connection to the Internet and a connection to the device.

8. The method of claim 5, wherein the gateway device connects to the device wirelessly.

9. The method of claim 5, wherein the gateway device connects to the Internet by connecting to a router connected to the Internet.

10. The method of claim 5, wherein the gateway device connects to the Internet by connecting to a second gateway device.

11. A system for securely connecting a device to a server, said system comprising:
    at least one device, said device comprising a digital certificate stored on the device, said digital certificate comprising one and only one web service address;

a router connected to the Internet;
a gateway, said gateway connected to the router, wherein the gateway comprises:
a connection to the router;
a processor and a memory, wherein the processor is configured to store at least one digital certificate of the device in memory;
a connection to the device;
wherein the gateway is configured to:
connect to the device;
receive the digital certificate from the device;
validate the digital certificate;
if the digital certificate is valid, read the digital certificate to determine the web service address;
if the digital certificate is valid, set up a secure channel for the device to connect only to the web service address listed in the digital certificate on the device via the router and prevent the device from connecting to any other network resource;
if the digital certificate is invalid, disconnecting the device and preventing it from connecting to any network resource.

12. The system of claim 11, wherein the gateway connects to the router by one of the following group: wi-fi, Ethernet, Bluetooth.

13. The system of claim 11, wherein the gateway and the router are contained in one housing.

14. The system of claim 11, wherein the gateway connects to the device by one of the following group: wi-fi, Bluetooth.

15. A gateway for connecting devices to the Internet, wherein each device comprises a digital certificate, said digital certificate comprising one and only one web service address, said gateway comprising:
a connection to a router;
a connection to the device;
a processor;
a memory, wherein the processor is configured to store at least one digital certificate of the device in memory;
wherein the processor is configured to:
initiate a connection with the device while keeping the device disconnected from the router and the Internet;
request the device's digital certificate while the device is still disconnected from the router and the Internet;
validate the digital certificate while the device is still disconnected from the router and the Internet;
read the digital certificate to determine the web service address while the device is still disconnected from the router and the Internet;
set up a secure channel for the device to connect only to the web service address listed in the digital certificate on the device via the router wherein the device cannot connect to any other web service and any other local network resource.

16. The gateway of claim 15, wherein the connection to a router is one of the following: wi-fi, Ethernet, Bluetooth.

17. The gateway of claim 15, wherein the connection to a router comprises at least one second gateway, said second gateway connected to the gateway and to the router.

18. The gateway of claim 15, wherein the connection to at least one device is one of the following: wi-fi, Bluetooth.

19. The gateway of claim 15, wherein the processor is further configured to:
disconnecting the device if the digital certificate cannot be validated.

20. The gateway of claim 15, wherein the processor is further configured to:
allow a user to enter at least one type of device that may not connect to the gateway;
determine the type of the device;
if the device is of the type that may not connect to the gateway, disconnecting the device.

21. The gateway of claim 15, wherein the processor is further configured to:
allow a user to enter at least one type of device whose bandwidth needs to be limited and to enter a maximum allowable bandwidth for the at least one type of device;
determine the type of the device;
if the device is a type of device whose bandwidth needs to be limited, limiting the maximum allowable bandwidth for the device to the maximum bandwidth.

* * * * *